US005557859A

United States Patent [19]
Baron

[11] Patent Number: 5,557,859
[45] Date of Patent: Sep. 24, 1996

[54] CONTINUOUS PROCESS FOR HARVESTING, SOLAR DRYING AND ACCUMULATING HAY OR OTHER CROPS

[76] Inventor: Stanley C. Baron, Box 368 Lamington Rd., Whitehouse, N.J. 08888

[21] Appl. No.: 545,391

[22] Filed: Oct. 19, 1995

Related U.S. Application Data

[63] Continuation-in-part of Ser. No. 214,980, Mar. 17, 1994, abandoned.

[51] Int. Cl.⁶ .................................................... F26B 7/00
[52] U.S. Cl. .................. 34/378; 34/102; 34/207; 34/93; 34/61; 34/420; 34/427; 34/512
[58] Field of Search ........................... 34/61, 236, 102, 34/189, 207, 76, 80, 268, 511, 513, 93, 420, 378, 427; 62/176.6

[56] References Cited

U.S. PATENT DOCUMENTS

| 61,393 | 1/1867 | Burns | 34/233 |
|---|---|---|---|
| 928,541 | 7/1909 | Rowland | 34/60 |
| 1,658,775 | 2/1928 | Campbell | 34/380 |
| 2,442,344 | 6/1948 | Curtis | 34/233 |
| 2,443,865 | 6/1948 | Moffett, Jr. | 34/233 |
| 2,465,070 | 3/1949 | Demuth | 34/60 |
| 2,532,530 | 12/1950 | Andersen et al. | 34/233 |
| 3,449,840 | 6/1969 | Francis | 34/187 |
| 3,510,958 | 5/1970 | Van Der Lely | 34/60 |
| 3,711,959 | 1/1973 | van der Lely | 34/102 |
| 3,882,611 | 5/1975 | Eykamp | 34/15 |
| 4,017,981 | 4/1977 | Ingvaldsen | 34/26 |
| 4,209,918 | 7/1980 | Klein | 56/12.2 |
| 4,307,519 | 12/1981 | Szücs et al. | 34/473 |
| 4,640,021 | 2/1987 | Gullickson | 34/15 |
| 4,912,914 | 4/1990 | Wingard | 56/DIG. 23 |
| 5,060,459 | 10/1991 | Herron | 56/DIG. 23 |
| 5,105,563 | 4/1992 | Fingerson et al. | 56/432 |
| 5,156,570 | 10/1992 | Justice, III | 56/12.2 |
| 5,377,481 | 1/1995 | Sibley et al. | 56/432 |

FOREIGN PATENT DOCUMENTS

| 1564091 | 3/1968 | France . |
| 2454750 | 12/1980 | France . |
| 5-41919 | 2/1993 | Japan . |

Primary Examiner—Henry A. Bennett
Assistant Examiner—Steve Gravini
Attorney, Agent, or Firm—Richard S. Roberts

[57] ABSTRACT

A method and apparatus for processing a crop growing in a field by continuously cutting the crop with a transportable cutter and forming a layer of the cut crop on a moving conveyor. A stream of solar heated air is continuously forced onto the moving crop to reduce its moisture content. Thereafter the crop is continuously formed into bales and the bales accumulated. The crop is processed by continuously cutting, solar drying, baling and accumulating it directly in the field in a one pass operation within a contained, transportable chamber. A dessicant material aids in removing moisture from air used for drying so that dried air can be recirculated.

20 Claims, 5 Drawing Sheets

CONTINUOUS PROCESS FOR HARVESTING, SOLAR DRYING AND ACCUMULATING HAY OR OTHER CROPS

CROSS REFERENCE TO RELATED APPLICATION

This application is a continuation-in-part of U.S. patent application Ser. No. 08/214,980 filed Mar. 17, 1994, now abandoned, which is incorporated herein by reference.

BACKGROUND OF THE INVENTION

Field of the Invention

The present invention relates to a process and apparatus for the continuous harvesting, solar drying and accumulation of hay or other crops. More particularly, the invention pertains to a process for continuously cutting, solar drying and subsequently baling hay.

It is known in the art of harvesting farm produce that crops, for example, hay, grass, alfalfa, and grain crops such as wheat, which naturally have a high moisture content, must be dried before storage in order to preserve them. By drying prior to storage, the crop is much easier to handle and a substantially improved storage life is obtained. As an example, newly cut grass has a moisture content of approximately 40%–80% of its weight. To maintain its quality, the dried young grass must be dehydrated to a point where the moisture content is approximately less than 20% of its weight before it is baled.

The usual method of processing grass or hay is for the farmer to cut the hay when it has reached the bud stage or in early blossom. It is then allowed to dry in the sun as a loose mass in the field for at least a day and preferably two days. The crop is then raked into windrows and turned so that the sun can dry the material that was on the ground. If it has not dried sufficiently, it must be teddered, or spread out on the ground again and allowed to dry further. It is then raked into windrows again. It is later baled either into square or large round bales. This method is disadvantageous since it requires at least three and as many as five passes of equipment in the field to complete a harvest. This inefficiency compels a manifold use of manpower and equipment. In addition, several days are required to bring in a crop since sun drying is a slow process and weather is unreliable. In order to facilitate field drying, some farmers spray chemicals on the cut crop to quicken drying time. This adds to expense and is generally undesirable. Furthermore, during field drying time, some of the cut crop is wasted due to weathering and collection losses. It is therefore desired to collect and dry a crop as quickly as possible so that it can be protected in storage.

Description of the Prior Art

Many methods of crop collection and drying have been attempted in the past. One known method is to gather the produce into a heap and then pass air, either heated or unheated through it in order to carry away excess moisture. Such drying has not been commonly used since it requires moving heavy, moisture laden batches of the product into and out of drying apparatus. One known type of drying apparatus includes a floor duct system upon which the crop is placed in order to allow air to be forced through the crop. Following drying, the dried crop is then removed and placed into storage. U.S. Pat. No. 4,017,981 discloses a batch drying apparatus wherein a grid covers a blower located on the ground. The crop is stacked over the grid and air is drawn in through an inlet, past a heater, out through the grid and through the crop. This arrangement is disadvantageous since it is difficult to efficiently dry a large, dense mound of wet grass or hay. U.S. Pat. Nos. 61,393; 2,442,344; 2,532,530 and 2,443,865 all show apparatus for drying an accumulated batch of hay by blowing heated air through the mound. In these disclosures, a wet mound of hay is first collected in a transportable truck and then the truck is moved into cooperation with a heat source at a hot air station where drying of the mound is done. The same disadvantage is encountered since it is difficult to force air through a heap of collected hay. U.S. Pat. No. 3,449,840 shows a continuous grain drying apparatus wherein wet grain in conveyed through a dry air stream and then collected. However, this disclosure does not show a transportable mechanism. The continuous process is conducted inside a stationary drying silo and still requires wet grain to be brought by truck to the silo. U.S. Pat. No. 3,882,611 describes an apparatus useful for continuously drying proteinous matter. U.S. Pat. No. 4,640,021 describes an apparatus for drying a stack of hay bales. Air is drawn through the open end of the stack where it picks up moisture and then is exhausted. Again, this is disadvantageous because it is difficult to force air through a heap of collected hay, especially in the form of a compressed bale. U.S. Pat. No. 5,105,563 shows an apparatus for harvesting and drying crops In this disclosure, the crops are collected into a transportable harvester and dried by means of a dryer arrangement such as a microwave heater.

It has now been unexpectedly found that a crop can be much more efficiently processed by continuously cutting, solar drying, baling and accumulating it directly in the field in a single pass operation within a contained, transportable chamber, wherein the crop is handled only once. Operator time, machine usage and fuel are conserved while weathering and collection losses are minimized. Solar drying reduces the energy required to dry the crop. A dessicant material aids in removing moisture from air used for drying so that the dried air can be recirculated.

SUMMARY OF THE INVENTION

Figure 1:
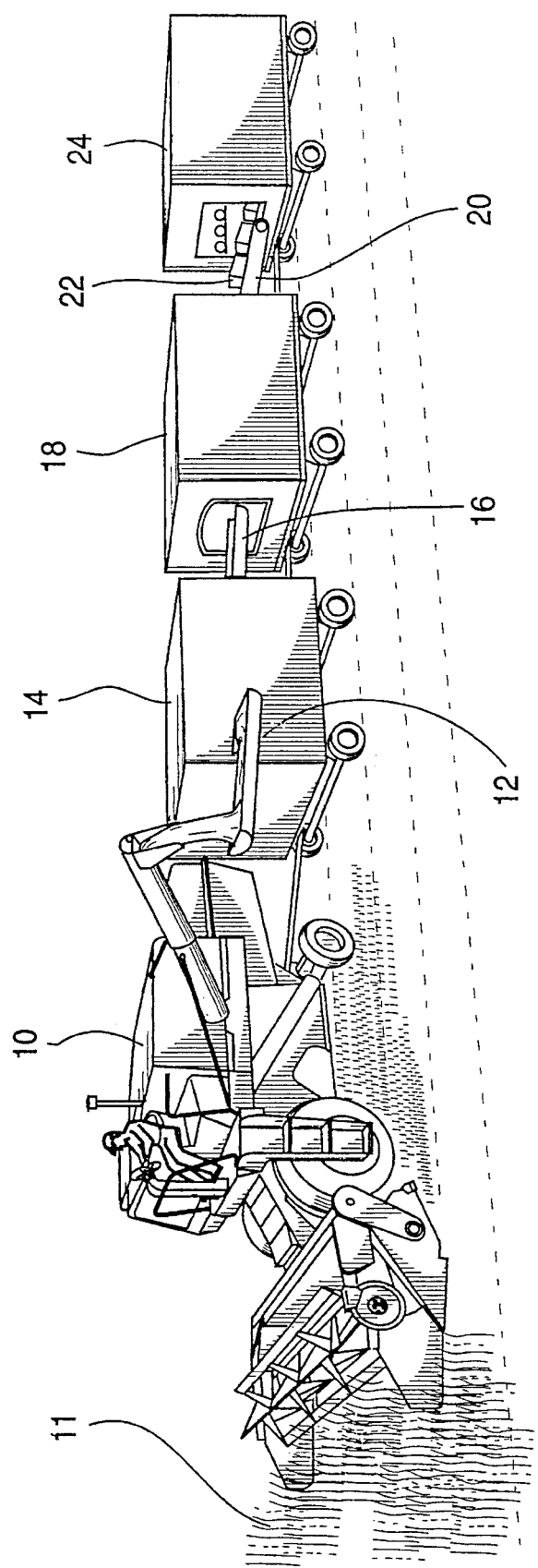
FIG. 1 shows a schematic representation of the apparatus of the present invention which continuously cuts, dries, bales and collects crops.

The invention provides a method for processing hay or other crops growing in a field which comprises continuously forming a layer of the crop on a moving conveyor; subjecting the crop layer on the moving conveyor to a drying treatment which substantially reduces the moisture content of the crop layer; and removing the dried crop from the moving conveyor. The crop layer on the moving conveyor is subjected to a solar drying treatment in an enclosed, transportable drying chamber surrounding the moving conveyor. The drying chamber has a plurality of first side walls, a first floor and a transparent or translucent roof. At least one of the first floor and first side walls is enclosed within at least one of a second floor and second side walls parallel with the first floor and first side walls with a space therebetween. There is at least one air passageway through at least one of the first side walls and first floor and a desiccant in the space. Solar drying is conducted by passing sunlight through the transparent or translucent roof.

The invention also provides an apparatus for processing a crop which comprises means for forming a layer of the crop on a moving conveyor; means for continuously subjecting the crop layer on the moving conveyor to a drying treatment which substantially reduces the moisture content of the crop layer; and means for continuously removing the dried crop from the moving conveyor. The means for continuously subjecting the crop layer on the moving conveyor to a drying treatment comprises an enclosed, transportable drying chamber surrounding the moving conveyor. The drying chamber has a plurality of first side walls, a first floor and a transparent or translucent roof. At least one of the first floor and first side walls is enclosed within at least one of a second floor and second side walls parallel with the first floor and first side walls with a space therebetween. There is at least one air passageway through at least one of the first side walls and first floor and a desiccant in the space.

DETAILED DESCRIPTION OF THE PREFERRED EMBODIMENT

As hereinbefore mentioned, the invention provides a method and apparatus for the continuous cutting, drying and baling of crops. In general, the inventive apparatus includes an apparatus for cutting and picking-up the cut crop from the field, a drying chamber, a baling chamber and a bale accumulator. The cutting and picking-up operation can be performed by well known equipment such as a combine or a tractor pulled cutter and sweeper. A suitable combine such as those manufactured by John Deere & Co. and the International Harvester Company may be used. The cut crop is then deposited in thin layer form onto a conveyor, such as a conveyor belt or auger. The conveyor belt transports the crop layer into and through a drying chamber which is pulled along by and behind the tractor/cutter/sweeper or combine while the conveyor continues to supply wet crop to the drying chamber inlet. In the drying chamber, the layer of cut crop is dried by one of several methods. In one embodiment, ambient air is forced over and through the crop by a blower. Incoming air picks-up crop moisture and exits through a suitable outlet at a much higher relative humidity. The incoming air is solar heated so that drying is quicker. In another embodiment of the invention, the crop can also be continuously tumbled in the drying chamber so that the chamber turns and shifts the crop which is loosely packed in it in a manner similar to a clothes drier. Power to tumble can be supplied by the tractor, the turning wheels of the drier or from turning equipment in the drying chamber itself. Several sources of heat are contemplated by the invention. One source is the engine cooling system of the tractor or combine. A tractor engine is usually water cooled and a water pump causes water to constantly circulate and keep the engine cool. In this process, the water is itself heated by the engine and subsequently cooled. Engine cooling water can be pumped from the tractor and directed to the heating chamber and back to the tractor in a closed heat exchanger system. Another source of heat is to use heating elements in the drying chamber which are powered by the tractor battery and alternator or any other heat source may be used. One possible heat source is microwave power. Still another heating method is to use oil in a closed system wherein oil coils are wrapped around the heating chamber. The oil is then heated electrically and pumped through the oil coils. The source of power would preferably be the tractor. The most preferred source of heat is solar radiation as hereinafter described. It is contemplated that the crop will have a dwell time in the drying chamber of from about one to about five minutes. The drying chamber can be from about 15 to about 30 feet long and from about 5 to about 10 feet wide. Longer drying time exposure can be accommodated by elongating the chamber in length or width or by modifying the conveyor belt path. In the preferred embodiment, the moisture content of the dried crop is reduced to a range of less than about 20% of its total weight. The most advantageous moisture content may be determined by those skilled in the art under the circumstances of use. In the preferred embodiment, the relative humidity of the incoming drying air is below about 45% and preferably ranges from about 30–35%. The air may be at existing atmospheric temperature, or be heated at any temperature which does not adversely affect the quality of the cut crop. By use of this continuous process, a single operator can cut, dry, bale and accumulate a crop at the rate of 200 and preferably at least 300 linear feet per minute. After passing through the drying chamber, a conveyor transports the crop into well known baling equipment for baling. The bales can then be knotted and accumulated on a truck. Suitable combines, balers, knotters and trucks include such as those manufactured by John Deere & Co., the International Harvester Company and the Ford Motor Company.

Referring to the drawings, FIG. 1 shows a schematic representation of the apparatus of the present invention. Combine 10 cuts and picks-up the crop 11 as shown and deposits the cut crop in layer form onto conveyor 12. The cut crop then enters drying chamber 14 where the crop is reduced in moisture content. Conveyor 16 then delivers the dried crop to baler 18. Conveyor 20 then delivers bales 22 to accumulator truck 24 for temporary storage before delivery to a barn or silo. While this embodiment shows the use of a combine and separate drier, baler and accumulator, it is understood that all of these operations can be assimilated into a single self-propelled vehicle. Alternatively, a tractor/cutter/sweeper combination can substitute for the combine.

Figure 2:
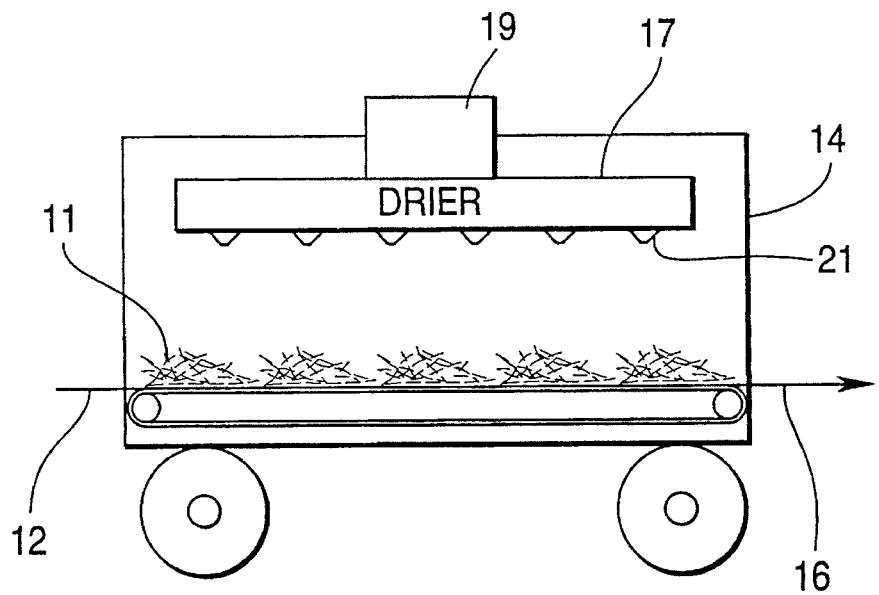
FIG. 2 shows a schematic representation of a drying chamber useful for the invention.
Figure 5:
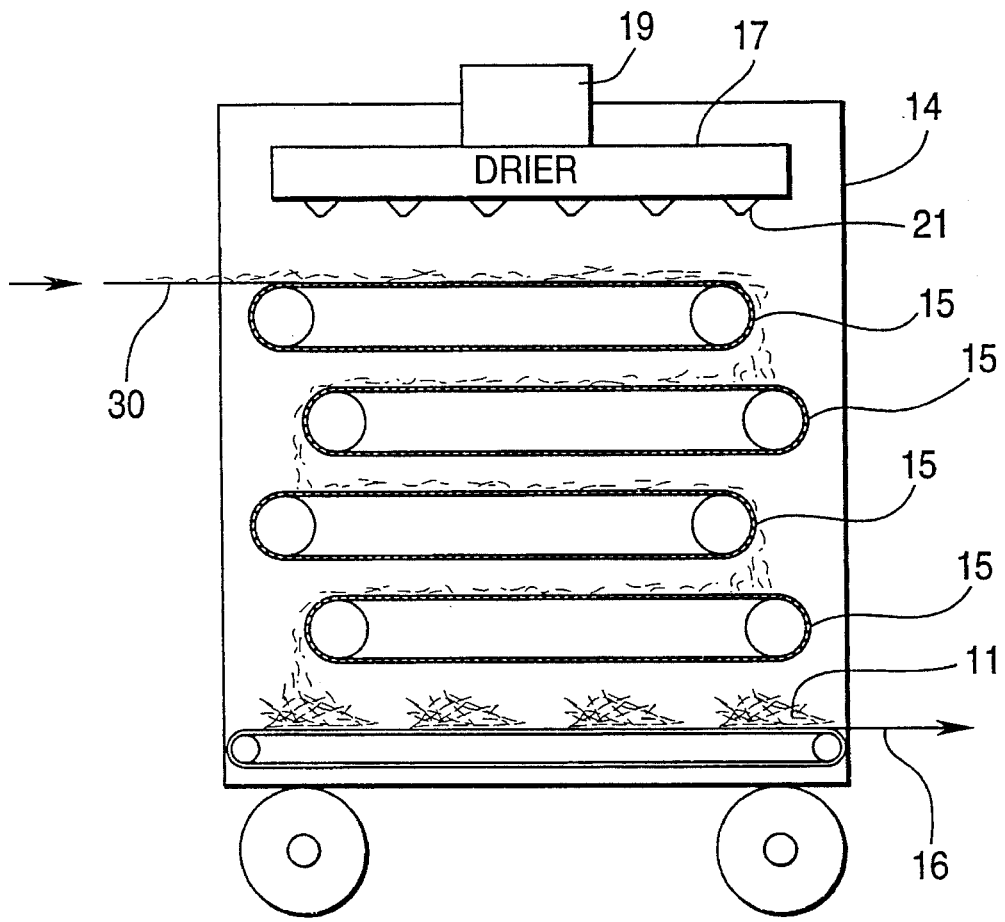
FIG. 5 shows a schematic representation of an alternate drying chamber including a series of wire mesh conveyors to move the crop back and forth in the drying chamber.

FIGS. 2 and 5 show a schematic representation of a drying chamber 14. Cut crop 11 enters by conveyor 12 and is treated by drier 17 which can be an air blower, heater, microwave device or other drying element as hereinbefore discussed. In the shown embodiment, drier 17 has an air intake/blower 19 which blows air onto the crop via vents 21. The drying chamber 14 may be visualized as a forage box such as is available from Gehl, of West Bend, Wis., to which is attached an apparatus which delivers high pressure jets of air such as those manufactured by Hanna-Sherman International of Portland, Oreg. FIG. 5 shows an alternate embodiment wherein cut crop enters drying chamber 14 by means of an auger or elevator 30. A series of wire or plastic mesh conveyors 15 move the crop back and forth and cause it to tumble in the drying chamber to increase dwell time prior to subsequently exiting by conveyor 16 to the baler.

Figure 3:
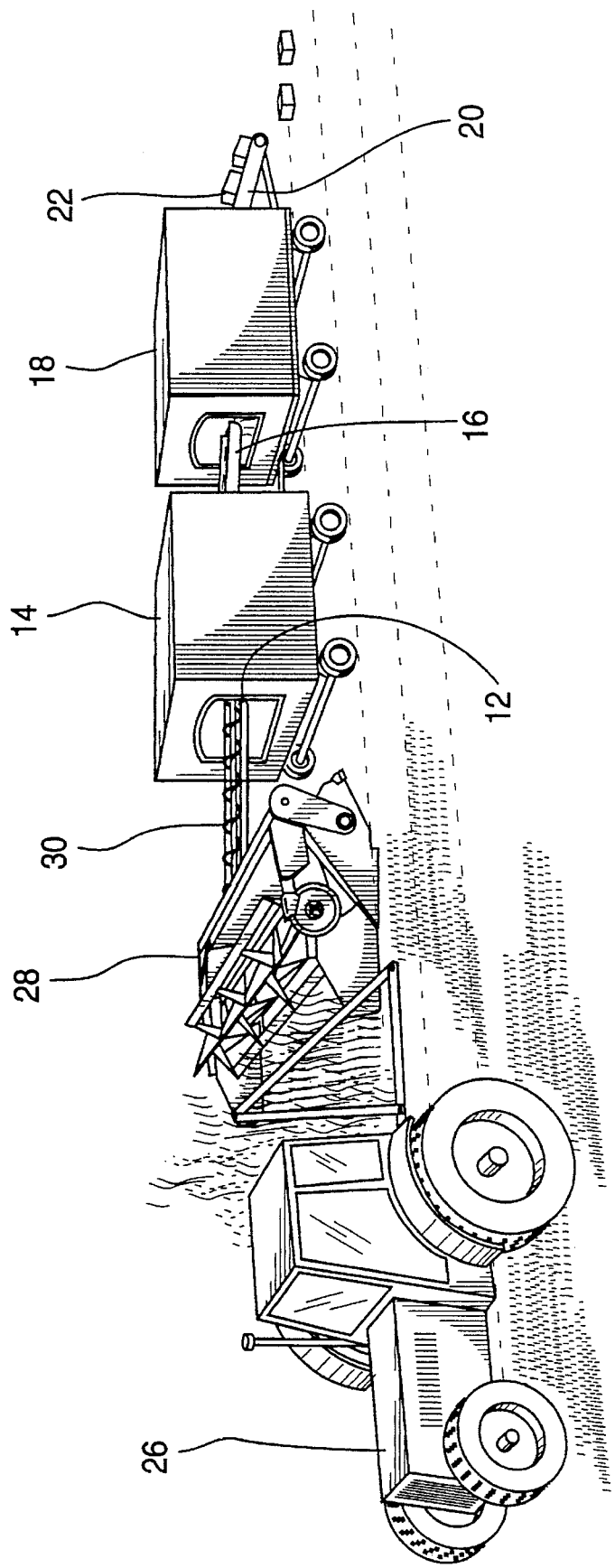
FIG. 3 shows a schematic representation of an alternate embodiment of the invention using a tractor.

FIG. 3 shows a schematic representation of an alternate embodiment of the invention which uses a tractor instead of a combine. Tractor 26 pulls combination mower/sweeper/conditioner 28. Suitable mower/conditioners include models 1460 and 1600 from John Deere & Co. and New Holland Haybine model 492 from the Ford Motor Company. Such conditioners are desirable since they break the stems of hay or other crops and release moisture contained therein for better drying. Auger or elevator 30 delivers cut crop to drying chamber 14 where the crop is reduced in moisture content.

Conveyor 16 then delivers the dried crop to baler 18. Conveyor 20 then drops bales 22 to the ground for later pickup. In the preferred embodiment, the mower/conditioner, drying chamber and baler do not trail directly behind the tractor but are offset from the tractor by one field row so that the tractor does not trample the crop.

Figure 4:
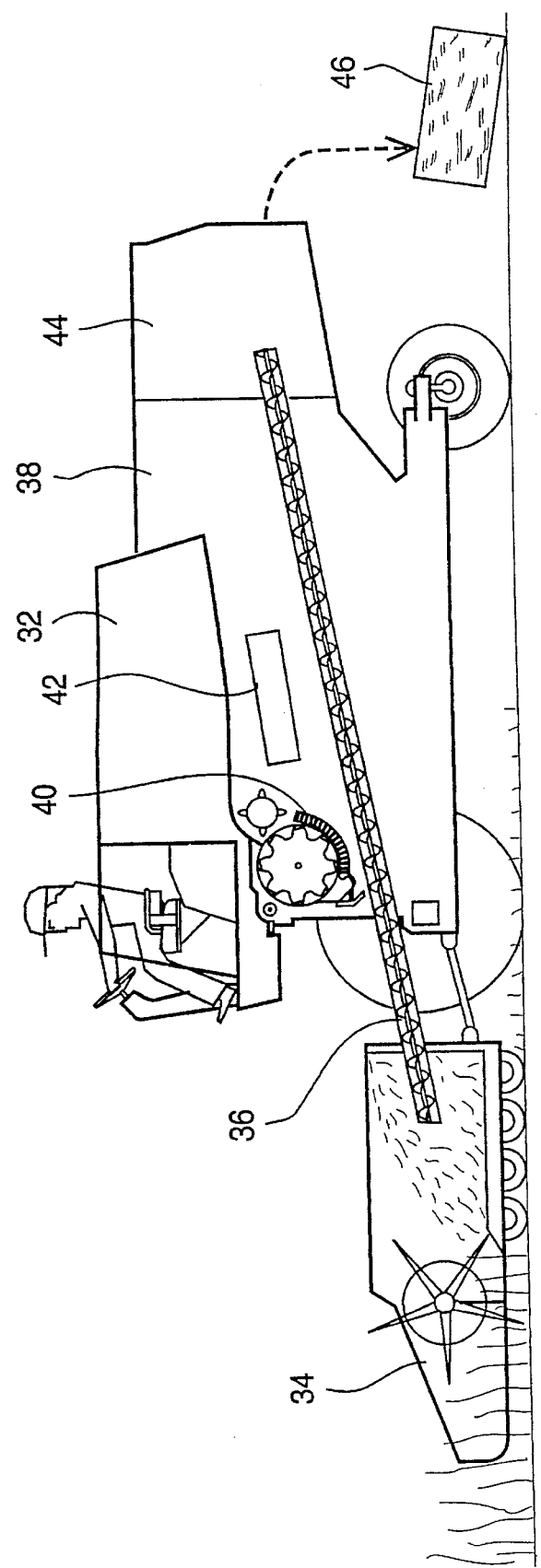
FIG. 4 shows a schematic representation of a an alternate embodiment of the invention which is self propelled.

FIG. 4 shows a schematic representation of another alternate embodiment of the invention which uses a consolidated, driven vehicle. Vehicle 32 harvests the crop with combination cutter/sweeper 34. Auger 36 conveys cut crop through drying chamber 38 which contains tumbling means 40 and heater 42. The auger then conveys the dried crop to baling zone 44. Bales 46 exit the rear of the baling zone for accumulation. In the preferred embodiment, a truck cooperates with the back end of the baling zone so that bales empty directly into it.

Figure 7:
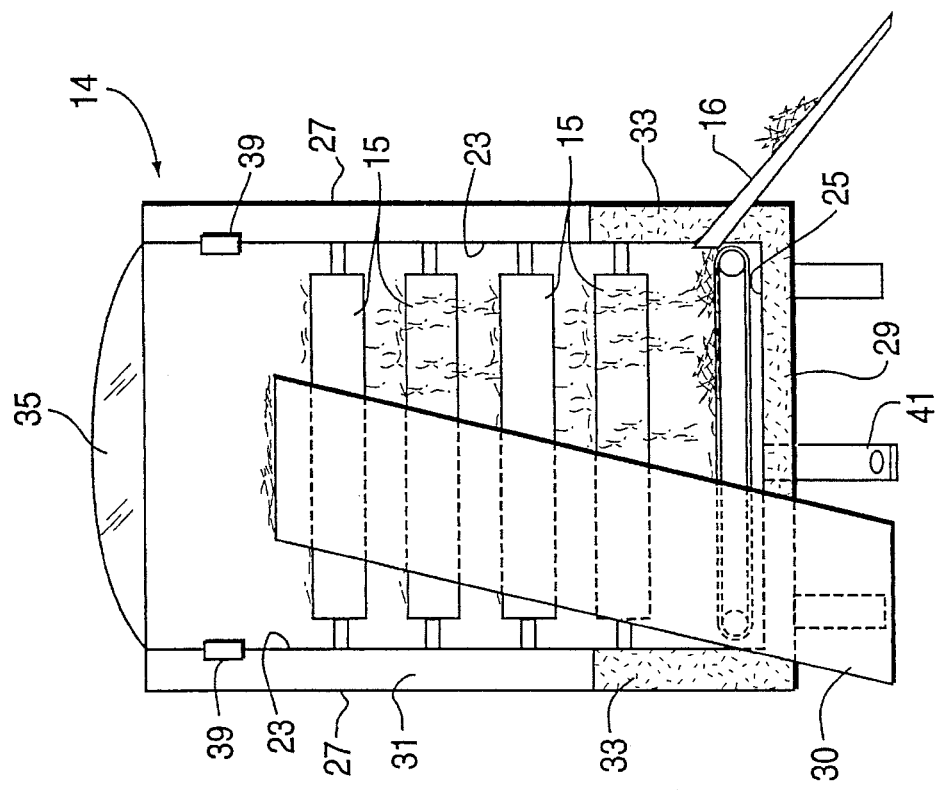
FIG. 7 shows a front cutaway view of an embodiment of the invention showing a light transmissive roof, an enclosed air passageway surrounding a drying chamber and intermediate desiccant.
Figure 6:
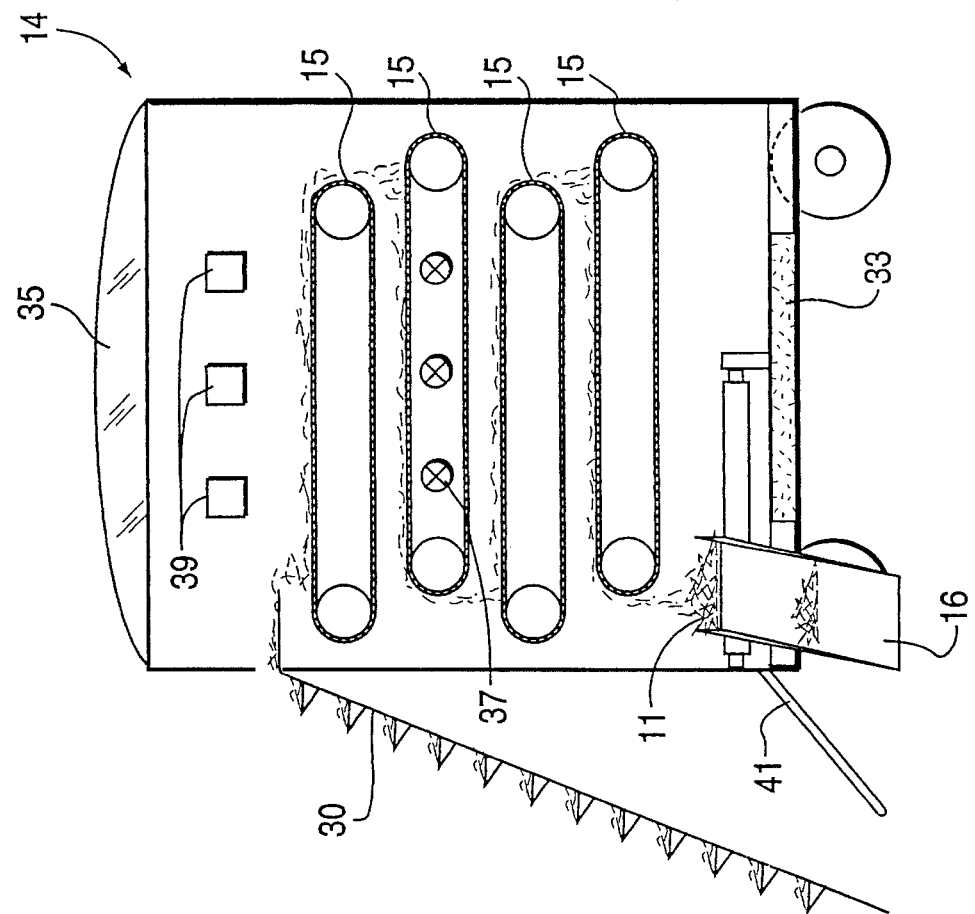
FIG. 6 shows a side cutaway view of an embodiment of the invention showing a light transmissive roof, an enclosed air passageway surrounding a drying chamber and intermediate desiccant.

FIGS. 6 and 7 show side and front views of a most preferred embodiment of the invention employing solar heating. The drying chamber 14 comprises a combination of inner and outer compartments with a space therebetween. The inner compartment comprises inner side walls 23 an inner floor 25. One or more of the inner side walls 23 may be enclosed within an outer side wall 27 and inner floor 25 may be enclosed by outer floor 29. Between the inner and outer walls and/or inner and outer floors is an airspace 31 which preferably contains a supply of a desiccant material 33. The roof 35 of the drying chamber 14 is light transmitting, that is, it is either transparent or translucent to admit solar radiation for heating. Sunlight passes through roof 35 and heats the air inside the inner compartment. Heated air is circulated within the inner compartment by fans 37. Moisture laden air passes out of the inner compartment via airholes 39 so that the moist air enters space 31. Desiccant 33, such as silica gel, removes the moisture from the air and emits it out of the drying chamber by suitable means, such as holes in the bottom of the drying chamber. Warmed, dried air then circulates back to the inner compartment via airholes 39 to repeat the cycle. The entire drying chamber 14 is suitable for being hauled by a tractor via hitch 41. In operation, hay is cut by a suitable mower/conditioner and rises up auger or elevator 30 and is deposited on the uppermost of a series of conveyors 15. The hay passes back and forth and drops to each successive underlying conveyor while hot air blows over it, thus reducing its moisture content. As seen in FIGS. 6 and 7, the lowermost conveyor preferably runs perpendicular to the upper conveyors and delivers dried hay out a conveyor or chute 16.

While the foregoing description characterizes the preferred embodiment of the invention, such is not to be construed as limiting thereto. Many modifications and variations are possible and are to be understood to be within the scope of the invention as defined by the appended claims.

What is claimed is:

1. A method for processing hay or other crops growing in a field which comprises continuously forming a layer of a crop on a moving conveyor; subjecting the crop layer on the moving conveyor to a drying treatment which substantially reduces the moisture content of the crop layer; and removing the dried crop from the moving conveyor; wherein the crop layer on the moving conveyor is subjected to a solar drying treatment in an enclosed, drying chamber surrounding the moving conveyor, the drying chamber having a plurality of first side walls, a first floor and a transparent or translucent roof, at least one of the first floor and first side walls being enclosed within at least one of a second floor and second side walls parallel with the first floor and first side walls with a space therebetween; at least one air passageway through at least one of the first side walls and first floor; and a desiccant in the space; wherein solar drying is conducted by passing sunlight through the transparent or translucent roof; said drying chamber being conveyed by means to convey said drying chamber to facilitate collection and drying of said crops.

2. The method of claim 1 further comprising continuously forcing a stream of air onto the layer.

3. The method of claim 1 further comprising continuously forcing a stream of air onto the layer with one or more fans positioned in the drying chamber.

4. The method of claim 1 further comprising forming said layer into rectangular or round bales after removing the dried crop from the moving conveyor.

5. The method of claim 1 further comprising causing the crop to continuously tumble in the drying chamber.

6. The method of claim 1 further comprising continuously severing the crop and forming a layer of the cut crop on the moving conveyor.

7. The method of claim 1 further comprising continuously severing the crop and forming a layer of the cut crop on the moving conveyor with a combine or a combination of a tractor, cutter and sweeper.

8. The method of claim 1 wherein the crop comprises hay, grass, alfalfa or a grain crop.

9. The method of claim 1 wherein the reduced moisture content of the crop layer is about 20% or less by weight of the crop layer.

10. The method of claim 1 wherein the dwell time in the drying chamber ranges from about 1 to about 5 minutes.

11. The method of claim 1 wherein said moving conveyor is a conveyor belt or an auger.

12. An apparatus for processing a crop which comprises means for forming a layer of a crop on a moving conveyor; means for continuously subjecting the crop layer on the moving conveyor to a drying treatment which substantially reduces the moisture content of the crop layer; and means for continuously removing the dried crop from the moving conveyor; wherein the means for continuously subjecting the crop layer on the moving conveyor to a drying treatment comprises an enclosed, drying chamber surrounding the moving conveyor, the drying chamber having a plurality of first side walls, a first floor and a transparent or translucent roof, at least one of the first floor and first side walls being enclosed within at least one of a second floor and second side walls parallel with the first floor and first side walls with a space therebetween; at least one air passageway through at least one of the first side walls and first floor; and a desiccant in the space; means to convey said drying chamber to facilitate collection and drying of said crops.

13. The apparatus of claim 12 wherein the roof comprises a transparent plastic.

14. The apparatus of claim 1 wherein the roof comprises a material selected from the group consisting of glass and acrylic.

15. The apparatus of claim 12 wherein the drying chamber comprises means for continuously forcing a stream of air onto the layer.

16. The apparatus of claim 12 wherein the drying chamber comprises one or more fans positioned in the drying chamber.

17. The apparatus of claim 12 further comprising means for forming said layer into rectangular or round bales after removing the dried crop from the moving conveyor.

18. The apparatus of claim 12 wherein the drying chamber comprises means for causing the crop to continuously tumble therein.

19. The apparatus of claim 12 comprising means for continuously severing the crop and forming a layer of the cut crop on the moving conveyor.

20. The apparatus of claim 12 comprising means for continuously severing the crop and forming a layer of the cut crop on the moving conveyor which comprises a combine or a combination of a tractor, cutter and sweeper.

* * * * *